J. M. WIGGIN.
NAILING MACHINE.
APPLICATION FILED JULY 1, 1899.

931,107.

Patented Aug. 17, 1909.
6 SHEETS—SHEET 4.

WITNESSES
A. T. Palmer
J. Murphy

INVENTOR
Joseph M. Wiggin
by Jas. H. Churchill
atty.

UNITED STATES PATENT OFFICE.

JOSEPH M. WIGGIN, OF BOSTON, MASSACHUSETTS, ASSIGNOR, BY MESNE ASSIGNMENTS, TO UNITED SHOE MACHINERY COMPANY, OF PATERSON, NEW JERSEY, A CORPORATION OF NEW JERSEY.

NAILING-MACHINE.

No. 931,107.      Specification of Letters Patent.      Patented Aug. 17, 1909.

Application filed July 1, 1899. Serial No. 722,505.

*To all whom it may concern:*

Be it known that I, JOSEPH M. WIGGIN, a citizen of the United States, residing in Boston, in the county of Suffolk and State of Massachusetts, have invented an Improvement in Nailing-Machines, of which the following description, in connection with the accompanying drawings, is a specification, like characters on the drawings representing like parts.

This invention relates to a nailing machine for use in the manufacture of boots and shoes, and is herein shown as embodied in a nailing machine for driving slugs or nails cut from a continuous wire, into the top lift of the boot or shoe.

The invention has for its object to provide a machine which is simple and durable, of a minimum number of parts, efficient and capable of operating at a substantially high speed.

The invention consists in novel features which will be hereinafter described and claimed.

Fig. 2, a side elevation on an enlarged scale of the upper portion of the machine shown in Fig. 1. Fig. 3, a side elevation on an enlarged scale with parts broken away, of the upper portion of the machine looking at the opposite side from that shown in Fig. 2. Figs. 7 and 8, details of the wire feed mechanism to be referred to. Figs. 9 and 10, enlarged sectional details to be referred to, and Figs. 11 to 16, details to be referred to.

The framework of the machine, which supports the operating parts, comprises as herein shown a head $a$, upright or post $b$ and base $c$ suitably secured together.

In the machine herein shown, the slugs or nails are cut from a continuous wire, which is fed at the proper time by a feed mechanism to be hereinafter described, into a movable cutter carrier, which also has the function of a throat for the reception of a driver bar, which drives the slug from the said throat into a hole previously formed in the work by an awl, which effects the feed of the work on a support or horn vertically movable with relation to said throat.

Figures 3, 11:
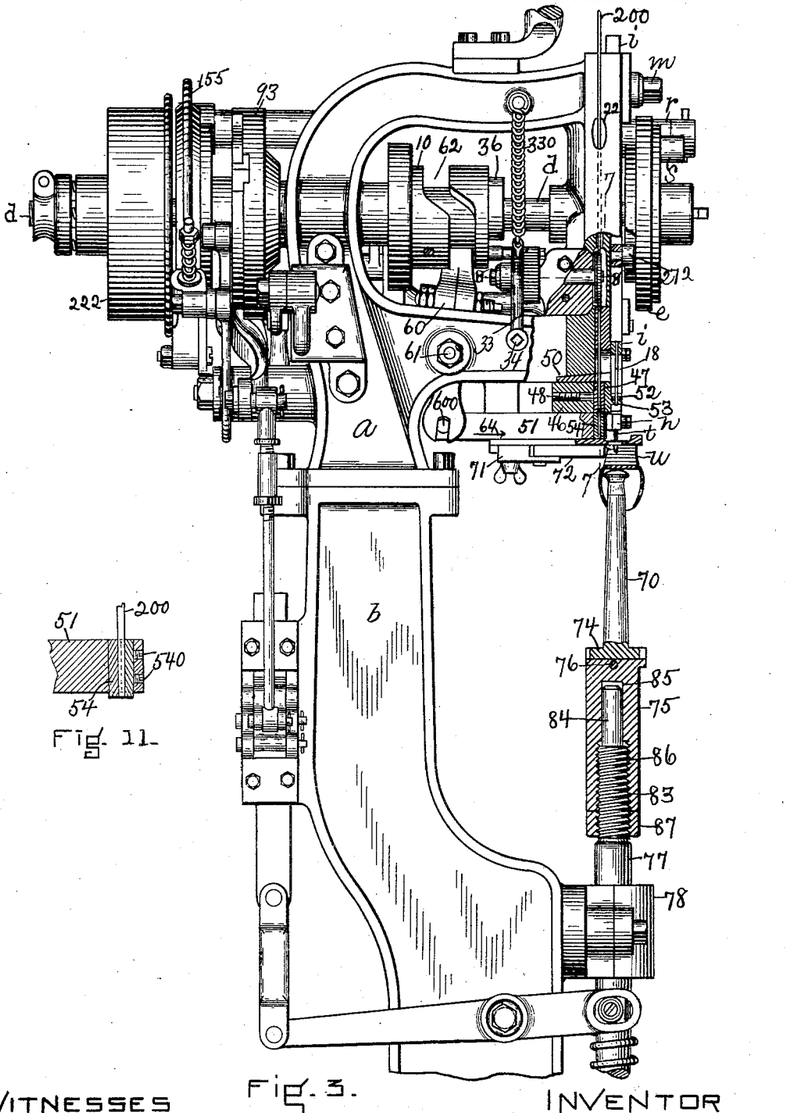
Figure 4:
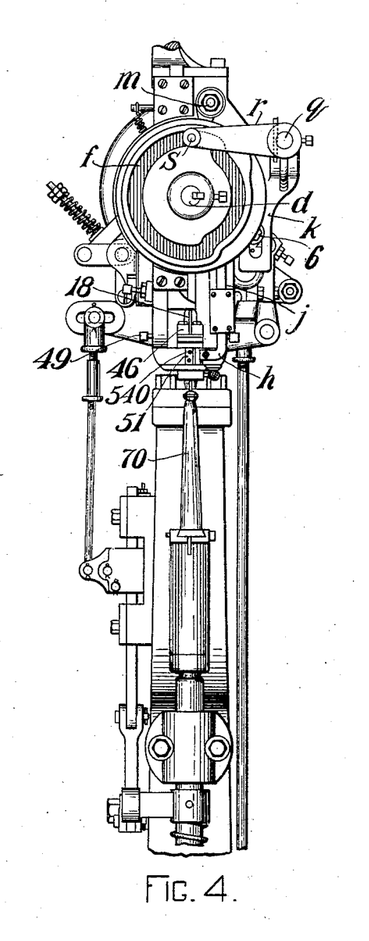
Fig. 4, a front elevation of the machine shown in Fig. 2 looking toward the right.
Figure 6:
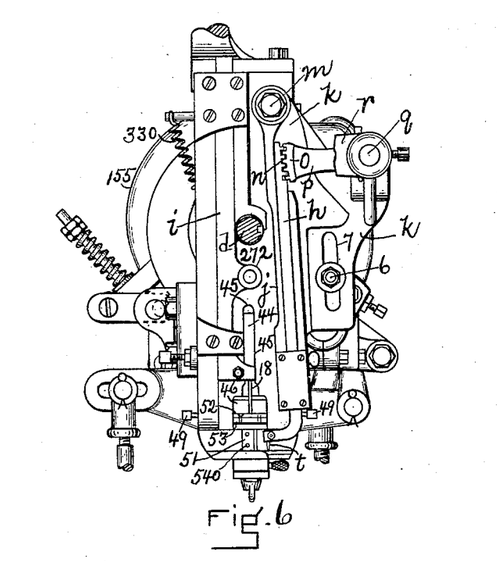
Fig. 6, a detail in elevation to be referred to, with certain parts omitted.

The head $a$ supports in suitable bearings a main or driving shaft $d$ having fast on it at its front end a cam disk $e$, provided on its opposite faces with cam grooves $f$, $g$, which respectively reciprocate the awl bar $h$ and the driver bar $i$, as will be described. The awl bar $h$ is vertically movable in suitable guides $j$ on an awl bar carrier $k$ (see Fig. 6) pivoted at $m$ to the front face of the head $a$ and above the main shaft $d$, the pivot $m$ being located close to a vertical line through the main shaft for a purpose as will be described. The awl bar $h$, in accordance with this invention, is made long and, as shown in Fig. 6, is provided at its upper end with rack teeth $n$, which are engaged by a toothed segment $o$ on the end of a crank arm $p$ fast to a rock shaft $q$, having bearings in the awl bar carrier $k$. The rock-shaft $q$ is provided with a second crank or arm $r$ extended substantially at right angles to a vertical line through the driving shaft $d$ and provided at its end with a stud $s$ (see Fig. 4) having a roller which extends into the cam groove $f$. The stud or roller $s$ on the crank arm $r$ as shown in Fig. 4, is located intermediate of the main shaft $d$ and the pivot $m$ for the awl bar carrier, and is in a substantially vertical line through the main shaft $d$, the purpose of which will be hereinafter explained. The cam groove $f$ is suitably shaped to effect reciprocation of the awl bar $h$ and thereby cause the awl to enter the work, shown in Fig. 3 as the heel $u$ of a boot or shoe.

Figure 1:
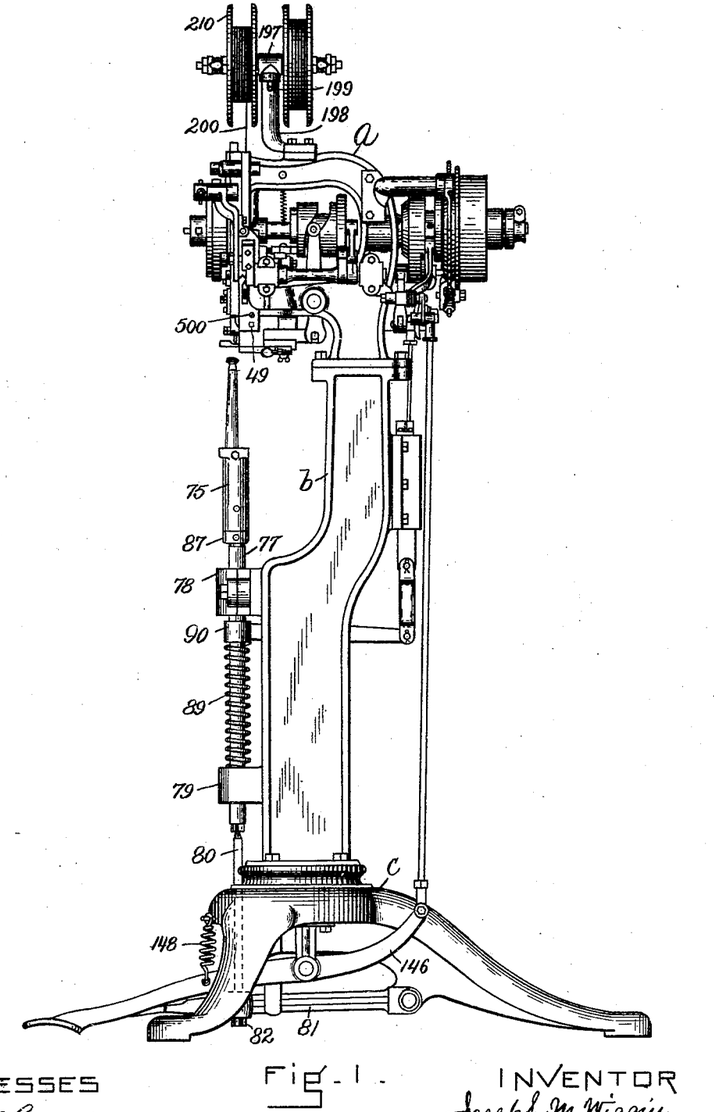
Figure 1 is a side elevation of a nailing machine embodying this invention.
Figures 2, 9, 10:
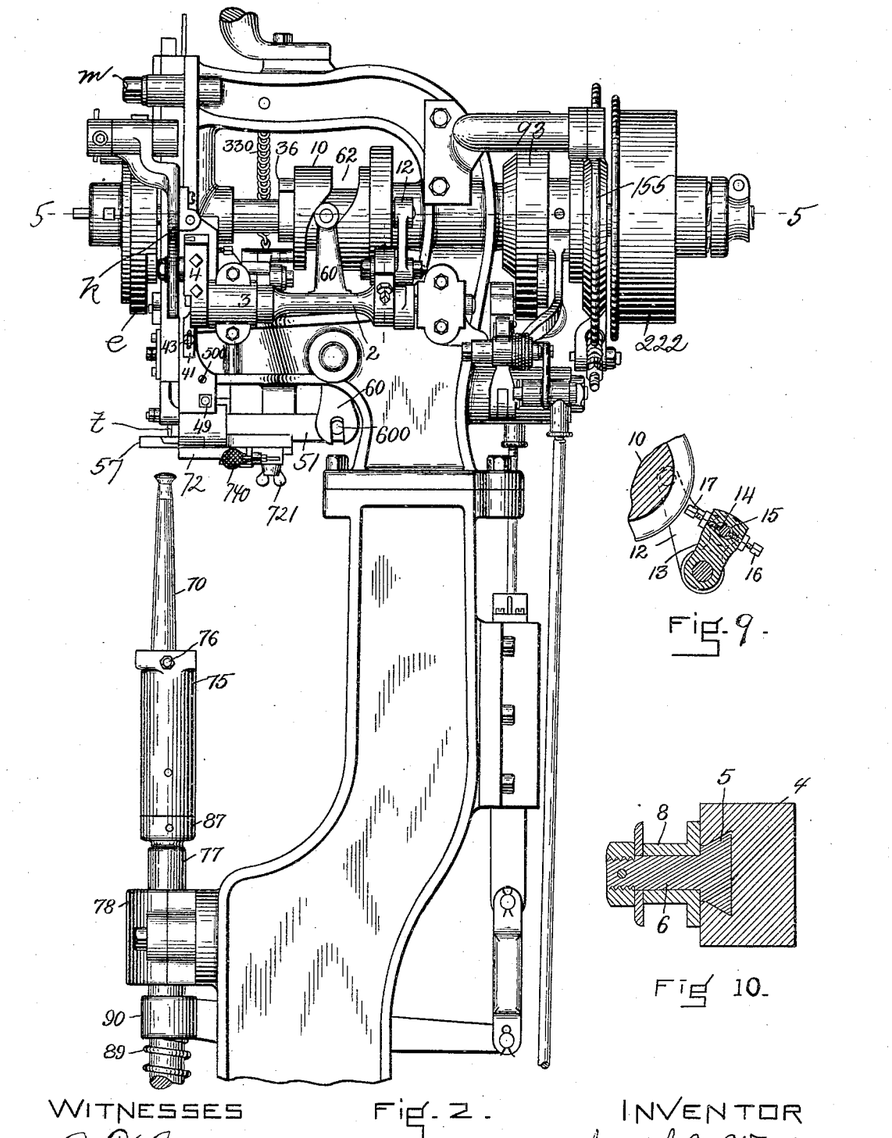
Figure 5:
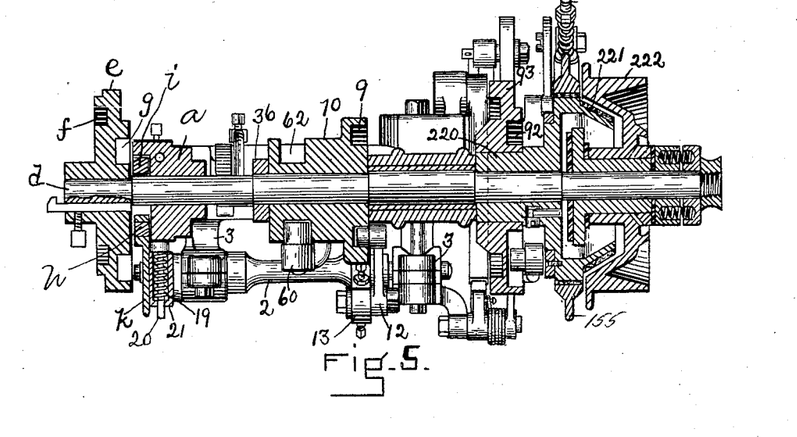
Fig. 5, a horizontal section on the line 5—5, Fig. 2.

The awl bar carrier $k$ is oscillated on its pivot $m$ to effect the feed of the work, by mechanism as will now be described. The awl bar carrier $k$ is connected to a rock-shaft 2 extended substantially parallel with the main shaft $d$ and having bearings in suitable lugs 3 attached to the head $a$ (see Figs. 2 and 5). The rock shaft 2 at its front end is provided with an upright crank or arm 4 (see Fig. 2), which is provided with a dove-tailed slot extended longitudinally thereof to receive it in a slide block 5 (see Fig. 10), having a stud or pin 6 extended through a slot 7 in the awl carrier $k$ and clamped thereto by a suitable nut, the said pin having on it a sleeve or bushing 8, which moves in the slot 7. The slide block 5, pin 6 and bushing 8 constitute an adjustable connection between the awl carrier $k$ and the upright crank 4 on the rock-shaft 2, whereby the extent of movement or oscillation of the awl carrier $k$ may be varied as required.

The rock-shaft 2 is actuated as herein shown (see Figs. 2 and 5) by a cam groove 9 in a cam hub 10 fast on the main shaft $d$, the cam groove 9 being made in one face of the cam hub 10 and having extended into it, a stud or roller on a crank or arm 12, loose on the rock-shaft 2 but adjustably connected to a crank or arm 13 fast on said shaft. The adjustable connection may and preferably will be effected as follows. The crank or arm 13 is provided with an enlarged opening 14 (see Fig. 9) through which extends a stud or bolt 15 also extended through the crank arm 12, the stud or bolt being adjustable in the opening 14 by the adjusting screws 16, 17, which position the rock-shaft with relation to the throw of the cam 9, so as to accurately adjust the awl bar carrier to properly position the awl in its first or starting position, or to properly line up the awl bar carrier and awl with relation to the driver 18 carried by the driver bar $i$, to compensate for wear in the operation of the machine. It will thus be seen that two adjustments are provided for the awl bar carrier and the awl bar $h$, namely, one adjustment between the awl bar carrier and the rock-shaft 2 and a second adjustment between the rock-shaft 2 and the crank arm 12 which operates it, which adjustments insure accurate operation of the machine in the feeding of the work. In order to insure the awl, when forced into the work, entering the work in a practically straight line and thereby avoid breaking the awl, which is liable to occur if the awl enters the material on an incline, the awl bar carrier $k$ is pivoted above the main shaft $d$, so that the awl in the oscillation of the said carrier to effect the feed of the work, may swing in the arc of a circle having a long radius, for, owing to the fact that the distance the awl is moved in the act of feeding the work is very small as compared with the length of the radius, the awl, while feeding the work, moves in a practically straight path.

Figure 12:
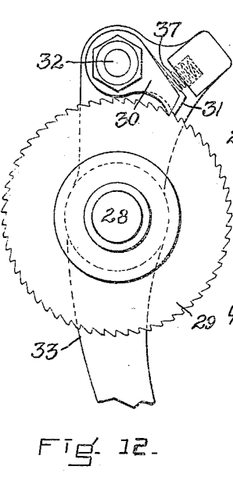

The awl bar $h$ is made comparatively long and is extended above the main shaft $d$, and its actuating crank $p$ is in substantially the same horizontal line with the crank $r$, which latter is actuated by the cam groove $f$ to raise and lower the awl bar, and the stud or roller $s$ thereby engages the cam groove $f$ substantially close to the pivot $m$ of the awl bar carrier (see Fig. 4), which construction enables the awl bar carrier $k$ to be oscillated on its pivot by the feed cam 9 to effect the feed of the work, without producing appreciable reciprocation or movement of the awl while in the work and in the act of feeding. The movement of the awl bar carrier $k$ toward the shaft $d$ is cushioned by a spring 19 encircling a rod 20 within a housing 21 attached to the said carrier (see Fig. 5), the said spring being compressed between the head of the rod 20 and the housing 21, when the head of the rod engages the head $a$ of the machine frame, as the carrier is moved toward the shaft $d$. The work is thus properly positioned to have driven into it a slug or nail cut from a continuous wire 200 as will now be described. The wire 200 as herein shown is taken from a reel 210 and led down through an opening 22 (see Fig. 3) in the side of the head $a$ and is passed between feed rolls 23, 24 (see Figs. 7 and 8). Referring to said figures, the feed roll 23 is provided with a milled or biting periphery and has on one side or face a flange 25 of a width greater than the thickness of the wire 200 to be formed into slugs or nails, and the feed roll 24 is provided with a like flange 26, and the said feed rolls are located in line with each other with their flanges opposed to each other as clearly shown in Fig. 8. The feed rolls 23, 24 are located in a suitable opening 27 in the front portion of the head $a$, and the feed roll 23 is fast on a shaft 28 provided with a ratchet wheel 29, with which engage two comparatively short feed pawls 30, 31, mounted on a pivot pin 32 carried by the short arm of a lever 33, loosely mounted on the shaft 28 and provided with a long arm having a set screw or back stop 34, which is normally held against a fixed portion of the frame by a spring 330, attached to the lever 33, so as to turn the same in such direction as will keep the set screw 34 in engagement with the frame of the machine, the said set screw controlling the backward throw or movement of the pawl carrying arm of the lever 33 toward the left, viewing Fig. 12, and thereby regulating the feed of the wire by the feed rolls 23, 24 on the next forward movement of the pawls 30, 31, as will be described. The stud or pin 32 has mounted upon it a roller 35, which coöperates with a cam 36 attached to or forming part of the cam hub 10, as herein shown, and which may be designated the wire feed cam. The cam 36 engages the roller 35 on the stud or pin 32 and rocks the lever 33 so as to rotate the ratchet wheel 29 and thereby effect the feed of the wire. The feed pawls 30, 31 are made of unequal length (see Fig. 12), so that one is in advance of the other a distance equal to one-half of a tooth of the ratchet wheel 29, which construction enables a comparatively coarse toothed ratchet wheel to be used to obtain strength and yet at the same time effect a comparatively fine feed of the wire.

Figure 7:
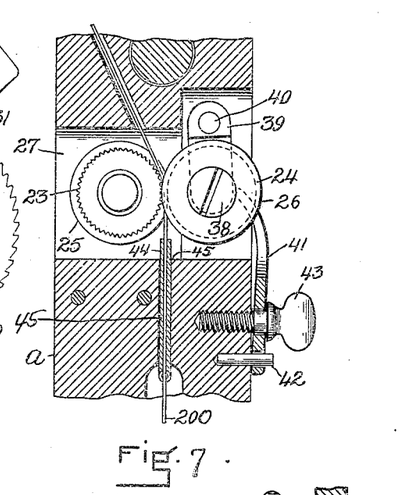
Figure 8:
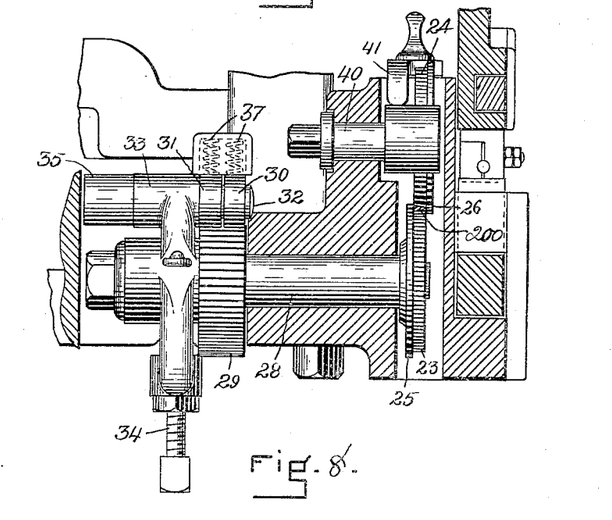
Figure 13:
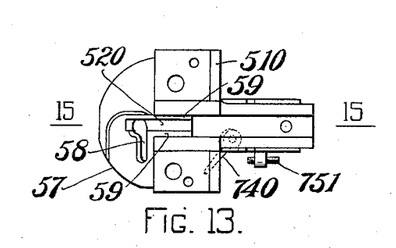
Figure 14:
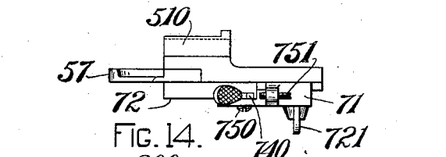
Figure 15:
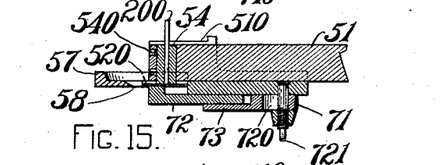
Figure 16:
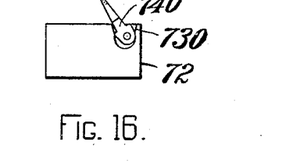

The pawls 30, 31 are normally held in engagement with the teeth of the ratchet by springs 37, (see Fig. 8), which may be made weak or light by reason of the fact that the pawls 30, 31 are made short or stubby, and the weak or light springs 37 reduce the wear upon the ratchet wheels and pawls, without impairing the efficiency of the feed mechanism. The feed wheel 24 is adjustable with relation to the feed wheel 23, and as shown in Fig. 7, the feed wheel 24 is loosely mounted on a stud or shaft 38 carried by a hanger 39 pivotally mounted on a stud or rod 40, and the feed wheel 24 is normally pressed toward the feed wheel 23 by a spring 41 secured to the head $a$ by pin 42 and having its pressure adjusted by the screw 43. The flanged feed wheels have coöperating with them a guide tube 44 located below the said wheels and removably fitted into a vertical slot 45 in the head or frame $a$. The slot 45 is enlarged at its lower end for the reception of a block 46 provided with an opening through it, into which are fitted stationary dies or knives 47 secured therein as by a screw 48 (see Fig. 3). The knives or dies 47 are suitably shaped for the passage of the wire 200 and are removable to permit them to be sharpened. The block 46 is secured in the enlargement of the slot 45 as herein shown by set screws 49 (see Fig. 6), and the said block is vertically adjustable in its slot as shown by a wedge plate or bar 50 (see Fig. 3), so as to accurately position said block with relation to a coöperating movable bar 51, with the upper surface of which the block 46 makes contact. The wedge 50 may be secured in its adjusted position by a screw 500 (see Fig. 2). It will be seen that the block 46 has two functions, one of which is to guide the wire 200, and the other of which is to carry the stationary knife or cutter. The block 46 has attached to it a guide for the driver 18, which guide is shown as a plate 52 secured to a rib or flange 53 projecting from the front face of the said block. The movable bar 51 is provided with an opening through it, into which are fitted the lower knives or cutting dies 54, which are suitably shaped for the passage of the wire 200 and which are removable from said bar, being secured therein by screws 540 (see Figs. 4, 6, 11, and 15). The movable bar 51 is supported upon a slotted presser block 510 attached to the head $a$, and to which is secured a plate 57 (see Figs. 13 and 14) against the underside of which the work bears. The pressure plate 57 is provided with a slot 58 extended through it for the passage of the awl into the work, which slot is made of sufficient length to permit movement of the awl in the act of feeding, and the said plate is also provided with a second slot, channel or groove 59 (see Fig. 13) extended substantially at right angles to the slot 58 and which forms a continuation of the slot in the presser block and which acts as a guide for the movable bar 51. The presser plate is provided with a channel 520 deeper than the slot 59 (see Figs. 13 and 15), so that the cutters or dies carried by the bar 51 may be extended below the said bar, so that the distance between the said dies or knives and the work is reduced to a minimum, and as a result the slug or nail is guided and supported while it is being driven into the work, thereby reducing the liability of the heads or upper ends of the slugs, crippling or bending when driven into the work.

The movable bar 51 is positively reciprocated as herein shown by means of a lever 60, pivoted to the head $a$ as at 61, and having its upper end extended into a cam groove 62 in the periphery of the cam hub 10, the lever 60 as herein shown being forked to straddle the bar 51, and the forks of the lever are slotted at their lower ends to straddle a pin 600 extended loosely through the bar 51, the said pin being flattened at its ends. On the forward movement of the bar 51 in the direction indicated by arrow 64, Fig. 3, the portion of the wire in the opening in the bar 51, is sheared or cut from the portion of the wire in the block 46, and a slug or nail is thus formed, which is placed into line with the driver 18 by the continued movement of the bar 51, and when so positioned the driver forces the cut slug out into the work, and the backward movement of the bar 51 again places the opening in it, into line with the opening in the block 46 ready to receive the portion of the wire 200 which is to form the next slug. It will thus be seen that the movable bar 51 has three functions, namely, it forms a carrier for the lower or movable knife or cutting die, it acts as a transferrer for the cut slug or nail, and serves as a guide for the driver. The driver bar $i$ and its attached driver 18 are reciprocated in a fixed path in a suitable guideway on the head $a$, by the cam groove $g$, in the face of the disk $e$, into which projects a stud or roller 272 on the driver bar.

The work $u$ into which the slugs or nails are driven is firmly held against the underside of the pressure plate, by a vertically movable work support or horn 70, and the said work is properly positioned by means of an adjustable gage, preferably made as herein shown and consisting of a block or bar 71 and a plate 72 dove-tailed onto the rear arm of the presser block, the plate 72 resting on an extension 73 on the block 71. The block is adjustable by means of a slot 720 through which extends a screw 721 into the arm of the presser block. The gage plate 72 is provided with a cam shaped slot 730 on its underside at one end, into which is fitted loosely a self-locking cam 740, which cam is connected to the extension 73 by a screw-stud 750. The cam has coöperating with it an adjustable stop 751 to regulate the backward movement of the gage plate. The cam adjustment is to enable a second row of slugs to be nailed without removing the work from the horn.

The horn or work support 70 is laterally adjustable with relation to the path of movement of the driver to insure the top lifts of heels of different widths bearing level against the presser plate, and to compensate for differences in the molding of the inner sole, and this result is accomplished as herein shown by fitting the bottom 74 of the horn in a dove-tailed slot in the split upper end of a sleeve 75 (see Figs. 3 and 4), and securing it therein by clamping screw 76. The sleeve 75 is fitted upon a post 77 movable in bearings 78, 79 attached to the upright $b$, and is connected at its lower end to a rod 80, which is loosely extended through a treadle 81 and provided below the same with a nut 82. The upper end of the post 77 is provided with a threaded portion 83 and a smooth portion 84 of smaller diameter, the latter fitting accurately a smooth upper portion 85 of the bore of the sleeve 75, and the threaded portion 83 engaging screw-threads on the larger portion 86 of said bore as shown in Fig. 3. The sleeve 75 is vertically adjustable by means of the screw-threaded portion 86 and is firmly locked in its adjusted position by a nut 87. This construction insures a strong, rigid and simple construction of horn. The horn is normally elevated or pressed toward the plate 57 by a spring 89, which encircles it between the bearing 79 and a collar 90 fast on the post 77. The horn 70 is adapted to be lowered in opposition to the spring 89 by a cam, preferably a cam-shaped groove 92 (see Fig. 5) in the face of a disk 93 fast on the main shaft $d$, which cam groove is suitably shaped to lower the horn a sufficient distance to release the work and permit it to be fed by the awl.

The particular mechanism for operating the horn will not be described in detail, since it is not specifically claimed in this application. The stopping and starting mechanism comprises a hub 220 fast on the main shaft and provided with an annular flange 221 constituting the fixed member of a clutch with which coöperates a movable member, shown as a pulley 222. A brake band 155 is arranged to coöperate with the periphery of hub 220 to bring the machine quickly to a stop. A suitable foot treadle 146, normally elevated by spring 148, controls the engagement of the fixed and movable members of the clutch and the application of the brake band. After treadle 146 is released by the operator the machine comes to rest at the proper point in its cycle of operations, the horn being lowered an additional distance to permit the work to be removed. Mechanism is provided which may be so adjusted, when it is desired to turn the main shaft by hand, that the clutch members will be prevented from coming into engagement when the brake is released by the rising of treadle 146. This stopping and starting mechanism, however, is not specifically claimed herein, and therefore will not be described in detail.

The machine herein shown is provided with two reels 210, which are mounted on a reversible support 197 having a depending spindle extended loosely into a socketed bracket or arm 198 attached to the head $a$. The socketed bracket has a notch at its upper end into which fits a stud 199 projecting from the said spindle, which acts to lock the reversible reel support in its proper position.

The operation of the machine may now be briefly described. The operator, having placed the work on the horn, depresses the foot treadle 146, which action releases the brake and permits the loose member of the clutch to engage the fixed member under the influence of a spring, thereby starting the machine in operation, the horn being held elevated by its lifting spring 89. The awl descends and engages the work; the horn is lowered by the cam 92 to permit the feed to take place, which is effected by movement of the awl carrier by the cam groove 9; the horn is again elevated against the presser plate and the awl is withdrawn from the work and moved backward, and just before the awl comes out of the work, the wire is fed through the stationary cutter carrier into the movable cutter carrier, which is now moved forward to cut off the slug and position it in line with the driver, which descends and forces the cut nail or slug into the hole previously formed by the awl. The driver then ascends, the combined cutter carrier and throat now retreats and the awl comes forward to its normal position, ready for the next operation of the machine, which continues until the pressure is relieved from the foot treadle, which permits the machine to be stopped with the horn lowered a sufficient distance to permit the work to be taken off.

The awl is given a wide throw backward beyond its normal position so as to permit the movable cutter carrier to be brought forward beyond the front face of the presser block and into line with the driver.

Claim.

1. In a machine of the class described, the combination of the following instrumentalities, viz:—a framework, a main or driving shaft supported thereby, an awl and its bar, a carrier for said awl bar pivoted to said framework above the driving shaft, a rock-shaft substantially parallel to the main shaft, means to connect the said carrier to said rock-shaft, a cam on the driving shaft to operate said rock-shaft and oscillate said awl bar carrier, a second rock-shaft supported by said carrier, a crank or arm on said second rock-shaft engaged with said awl bar, and a cam to operate said second rock-shaft to reciprocate said awl bar and its attached awl, substantially as described.

2. In a machine of the class described, the combination of the following instrumentalities, viz:—a framework, a main or driving shaft supported thereby, an awl and its bar, a carrier for said awl bar pivoted to said framework above the driving shaft, a rock-shaft substantially parallel to the main shaft, means to connect the said carrier to said rock-shaft, a cam on the driving shaft to operate said rock-shaft and oscillate said awl bar carrier, an adjustable connection between said rock-shaft and said cam, a second rock-shaft supported by said carrier, a crank or arm on said second rock-shaft engaged with said awl bar, and a cam to operate said second rock-shaft to reciprocate said awl bar and its awl, substantially as described.

3. In a machine of the class described, the combination of the following instrumentalities, viz:—a framework, a main or driving shaft supported thereby, an awl and its bar, a carrier for said awl bar pivoted to said framework above the driving shaft to effect movement of the awl in the arc of a circle having a substantially long radius, means to oscillate said carrier, a rock-shaft supported by said carrier above the main shaft, a crank or arm for said rock-shaft connected with said awl bar, a cam on the driving shaft, and a second crank or arm on the said rock-shaft engaging said cam intermediate of the main shaft and pivot for said carrier, for the purpose specified.

4. In a machine of the class described, the combination of the following instrumentalities, viz:—a main shaft, an awl and its bar, a pivoted carrier for said awl bar, a rock-shaft, an adjustable connection between said rock-shaft and said carrier, a cam to operate said rock-shaft, and an adjustable connection between said cam and rock-shaft, substantially as described.

5. In a machine of the class described, the combination of the following instrumentalities, viz:—a stationary framework, a main shaft supported thereby, an awl and its bar, a carrier for said awl bar pivoted to said framework, means to oscillate said carrier, means supported by said carrier to reciprocate said awl bar, a driver, a driver bar movable in a fixed path in the stationary framework, and means to operate said driver bar, substantially as described.

6. In a machine of the class described, the combination of the following instrumentalities, viz:—a presser plate having an opening for the passage of an awl, and provided with slots or channels of unequal depths extended substantially at right angles to said opening, and a movable cutter carrier movable in one of said slots or channels and having a cutter or knife projecting below it into the other of said slots or channels, for the purpose specified.

7. In a machine of the class described, the combination of the following instrumentalities, viz:—a stationary framework, a main shaft supported thereby, a driver bar movable in a guideway in said stationary framework, a cam on the main shaft to reciprocate said driver bar, an awl and its bar, a carrier for said awl bar pivoted to said framework above the main shaft, a cam on the main shaft to oscillate said awl bar carrier, a rock-shaft mounted in said carrier, a crank on said rock-shaft in engagement with said awl bar, a second crank on said rock-shaft, a cam on the main shaft having a groove which engages said second crank to reciprocate said awl bar, a wire feed mechanism, a stationary cutter carrier having an opening through it into which the wire is fed, a movable cutter carrying bar having an opening through it into which said wire is fed from the stationary cutter carrier, a cam to reciprocate said movable cutter carrier and move it from its normal position with its opening in line with the opening in the stationary cutter carrier to cut a slug or nail and place it in line with the driver, substantially as described.

8. In a machine of the class described, an awl and its bar, a movable carrier in which said awl bar is reciprocated, means to move said carrier, and means supported by said movable carrier to reciprocate said awl bar, substantially as described.

9. In a machine of the class described, the combination of the following instrumentalities, viz:—a stationary framework, a main shaft supported thereby, a driver bar movable in a guideway in said stationary framework, a cam on the main shaft to reciprocate said driver bar, an awl and its bar, a carrier for said awl pivoted to said framework above the main shaft and between said cam and said framework, means actuated from the main shaft to oscillate said bar laterally and means actuated from the main shaft to reciprocate it vertically, a wire feed mechanism, a stationary cutter carrier having an opening through it into which the wire is fed, a movable cutter carrying bar having an opening through it into which said wire is fed from the stationary cutter carrier, a cam to reciprocate said movable cutter carrier and move it from its normal position with its opening in line with the opening in the stationary cutter carrier to cut a slug or nail and place it in line with the driver, substantially as described.

10. In a machine of the class described, the combination of the following instrumentalities, viz:—a main shaft, an awl bar and its awl, a pivoted carrier for said awl bar, a rock-shaft operated from said main shaft to oscillate said awl-bar carrier, means in sliding engagement with said carrier and said rock-shaft for adjustably connecting the said carrier with said rock-shaft, and means for adjusting the operative connection of the said rock-shaft with said main shaft, substantially as described.

11. In a machine of the class described, in combination, a framework, a main or driving shaft supported thereby, an awl and its bar, a carrier for said awl bar pivoted to said framework above the driving shaft, means to oscillate said carrier, a cam on said main shaft, a crank or arm engaging said cam in close proximity to the pivot for said awl bar carrier and operatively connected with said awl bar to reciprocate the same.

12. In a machine of the class described, the combination of the following instrumentalities, viz:—a wire feed mechanism, a stationary cutter carrier having an opening through it into which the wire is fed, a movable cutter carrying bar having an opening through it, cutters removably secured in the opening in said movable cutter carrying bar and projecting below the same, a presser plate having a guideway in which the cutter carrying bar is moved, and provided with a channel below the bottom of said guideway to receive the projecting ends of the cutters carried by the movable cutter carrying bar whereby crippling or binding of the nails while being driven into the work is avoided, said presser plate having a slot extended substantially at right angles to said guideway and channel, substantially as described.

In testimony whereof, I have signed my name to this specification in the presence of two subscribing witnesses.

JOSEPH M. WIGGIN.

Witnesses:
  JAS. H. CHURCHILL,
  J. MURPHY.